UNITED STATES PATENT OFFICE.

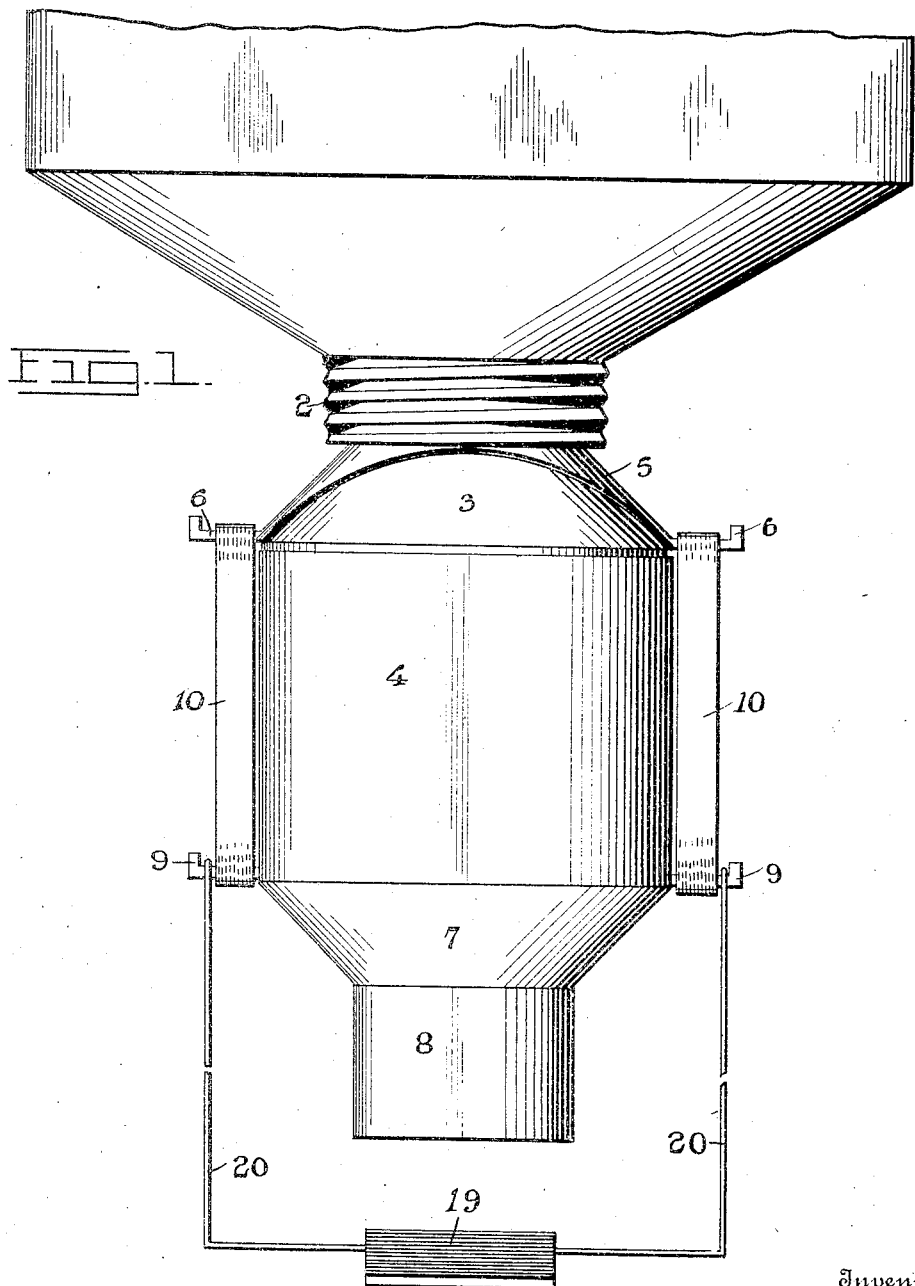

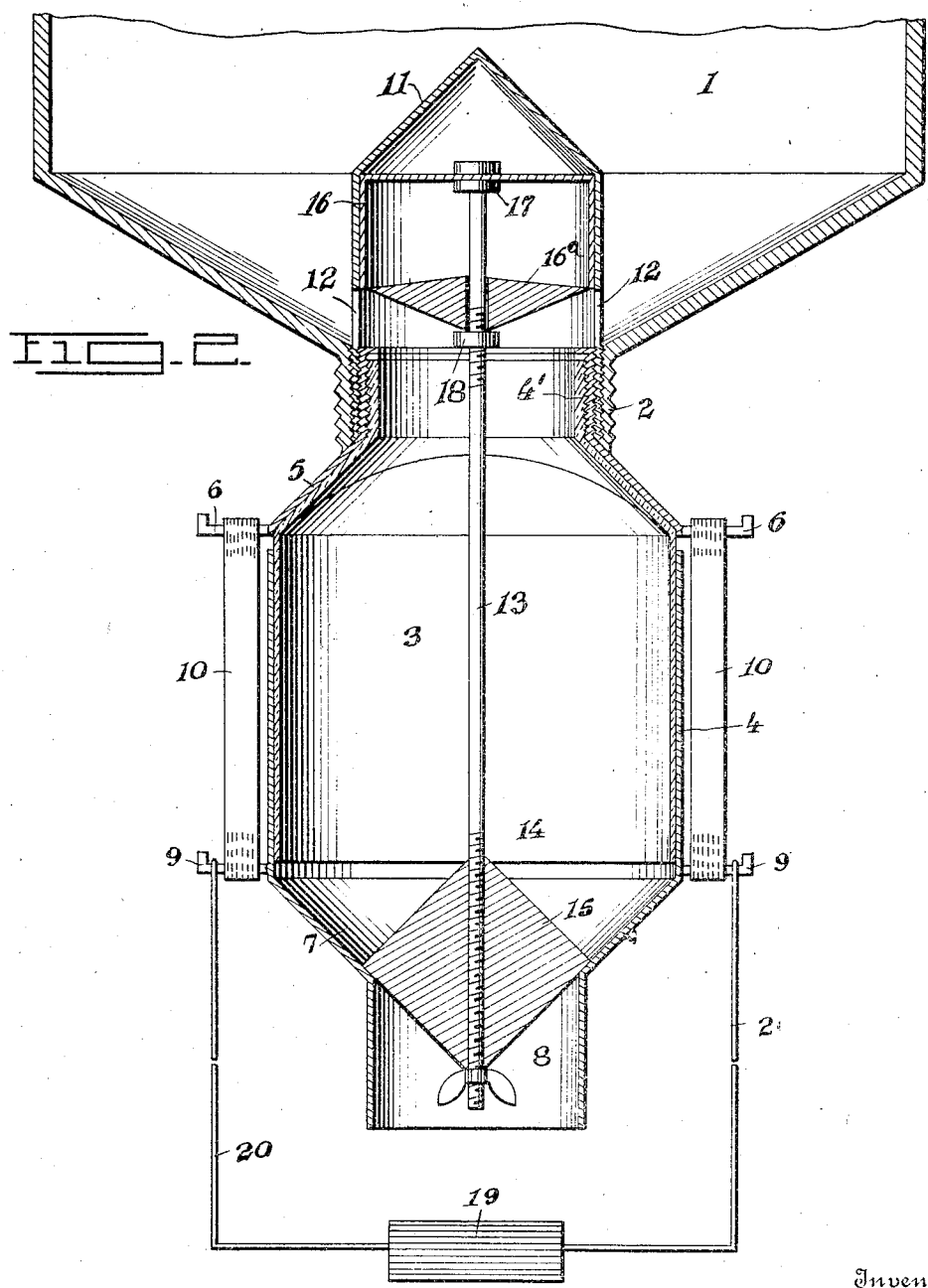

WALLACE NEWTON, OF HURON, SOUTH DAKOTA.

MEASURING VESSEL.

1,037,794. Specification of Letters Patent. Patented Sept. 3, 1912.

Application filed September 6, 1911. Serial No. 647,856.

*To all whom it may concern:*

Be it known that I, WALLACE NEWTON, a citizen of the United States, residing at Huron, in the county of Beadle and State of South Dakota, have invented new and useful Improvements in Measuring Vessels, of which the following is a specification.

This invention provides an appliance whereby commodities may be dispensed in measured quantity, the device being intended for use chiefly by merchants in measuring sugar, coffee, beans, flour and the like, the construction admitting of the quantity to be dispensed at one time being regulated within certain limits.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a view in elevation of a measuring vessel embodying the invention. Fig. 2 is a vertical central section thereof.

Corresponding and like parts are referred to in the following description, and indicated in all the views of the drawings, by the same reference characters.

The numeral 1 designates a storage chamber, hopper, or bin in which the material to be dispensed is stored in quantity. The bottom of the hopper slopes and terminates in an opening from which a rim 2 depends.

The measuring vessel comprises an inner shell 3 and an outer shell 4. The inner shell 3 is preferably of glass and its upper portion is made tapering and terminates in an externally screwthreaded extension 4'. A metal piece 5 is fitted to the tapered part of the shell 3 and is secured thereto by means of a screw thread joint. A rubber gasket is interposed between the upper end of the part 3 and the cap 5. Arms 6 project outwardly in opposite directions from the metal cap 5. The outer shell 4 is of metal and telescopes with the shell 3 and has a tapered portion 7 from which a spout 8 is pendent. Arms 9 project outwardly from the lower portion of the shell 4. Yieldable connections 10 connect the arms 6 and 9 and may consist of elastic bands or like means. The connections 10 support the outer shell 4 and hold it at the limit of its upward movement. A bonnet 11 is fitted to the upper end of the shell 3 and its upper end is made tapering and its lower portion is screwthreaded to match the screwthreaded parts of the rim 2 and extension 4'. Openings 12 are formed in the sides of the bonnet 11 at a point to project above the tapered bottom of the hopper 1, said openings admitting of the commodity discharging from the hopper into the measuring vessel.

A rod 13 is arranged within the measuring vessel and has its lower portion screwthreaded, as indicated at 14, and provided with a cut-off 15 which is adjustable thereon, said cut-off consisting of a weight and having its upper and lower parts tapered. The cut-off 15 at a middle point is of larger diameter than the upper end of the spout 8 so that when said cut-off is at its lowest position or resting upon the upper part of the spout 8 the commodity is prevented from discharging. A second cut-off 16 is located upon the upper portion of the rod 13 and comprises two parts 16 and 16$^a$. The part 16 is secured to the top of the rod 13 by means of clamp nuts 17 and constitutes the cut-off proper and is hollow and embodies a top and a rim pendent from the top and fitting snugly within the cylindrical portion of the bonnet 11. The part 16$^a$ is loose upon the rod 13 and has a limited movement thereon between the lower one of the nuts 17 and a nut 18 adjustable on the said rod and acts as a follower to close the lower end of the part 16. The nuts 17 and 18 form stops to limit the movements of the follower.

The parts are so adjusted that when the shell 4 is at the limit of its upward movement and is closed by the cut-off 15 resting upon the upper edge portion of the spout 8 the cut-off 16 is elevated to clear the openings 12 so that the commodity from the hopper 1 may discharge through the openings 12 into the measuring vessel. It is to be understood that the cut-off 16 has a limited movement which is determined by the stop at the upper end of the cylinder portion of the bonnet 11 and by the stop formed at the lower end of the part 11 by the cap 5. The upward movement of the telescoping shell 4 is regulated by the position of the lower cut-off 15. When the cut-off 15 is moved upwardly upon the rod 13 the capacity of the measuring vessel is reduced and when the cut-off 15 is moved downwardly upon the rod 13 the capacity of the measuring vessel is increased. The cut-off 15 is adjusted on the rod 13 by turning the same either to the right or to the left. When the shell 4 is moved downwardly the rod 13 correspondingly descends until the cut-off 16 reaches the limit of its downward movement and closes the openings 12 and a continued downward movement of the shell 4 moves the same away from the lower cut-off 15, thereby uncovering the spout 8 and permitting the commodity contained in the vessel to discharge through the spout into a suitable receptacle properly positioned to receive the same. The shell 4 may be moved outwardly in any manner and in order that both hands may be left free it is proposed to connect the shell 4 to a treadle 19, which is conveniently located to admit of pressure of the foot being exerted thereon. Rods 20 or like connections are interposed between the lower arms 9 of the shell 4 and the treadle 19. When the pressure exerted to draw the shell 4 downward is released the connections 10 come into play and move the shell 4 upwardly, thereby closing the outlet 8 and uncovering the openings 12 so that the commodity may pass from the hopper into the measuring vessel to again fill the same preliminary to the next operation for discharging the contents thereof.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. A measuring vessel comprising telescoping members having an upper inlet and a lower outlet, upper and lower cut-offs for the inlet and the outlet, means adjustably connecting the lower cut-off to the upper cut-off to vary the capacity of the vessel, and means for removing one of the members of the vessel to effect the discharge of the contents thereof, the inlet closing in advance of the opening of the outlet and the latter closing in advance of the opening of the inlet when sliding the members together.

2. A measuring vessel comprising upper and lower telescoping shells, yieldable connecting means between the two shells, the upper shell having an inlet and the lower shell an outlet, a cut-off for the inlet embodying a follower having a limited movement, a cut-off for the outlet, connecting means between the cut-offs having a limited movement with reference to the said follower and having adjustable connection with the lower cut-off, and means for moving the lower shell upon the upper shell in opposition to the yieldable connection.

3. In combination a hopper, a shell having a portion extending into the hopper and provided with an opening to admit of the contents of the hopper discharging into the shell, a lower shell telescoping with the upper shell and having a discharge opening, a yieldable connection between the two shells, upper and lower cut-offs for the entrance and the discharge openings of the measuring vessel, the upper cut-off embodying a follower and connecting means between the two cut-offs having a limited movement with reference to the said follower and adjustable connection with the lower cut-off.

4. In combination a hopper, an upper shell having an extension projecting into the hopper and formed with an inlet opening, a lower shell telescoping with the upper shell and having a discharge opening, a yieldable connection between the two shells an upper cut-off embodying a follower having a limited movement, a lower cut-off, a connection between the cut-offs having a limited movement with the said follower and adjustable connection with the lower cut-off, and means for moving the lower shell against the tension of the yieldable connection.

In testimony whereof I affix my signature in presence of two witnesses.

WALLACE NEWTON.

Witnesses:
 C. A. BLAKE,
 R. H. MAAG.